F. W. BREDER & J. H. LOYD.

ARTIFICIAL BAIT.

APPLICATION FILED NOV. 24, 1911.

Reissued Dec. 24, 1912. 13,499.

Witnesses
Frank S. Gatcliffe
Henry T. Burgett

Inventors
F. W. Breder,
and J. H. Loyd.
By Brooks & Barnes
Attorneys

UNITED STATES PATENT OFFICE.

FREDERICK W. BREDER AND JOHN H. LOYD, OF SPRINGFIELD, MISSOURI; SAID LOYD ASSIGNOR TO MARSHALL O. BRIXEY, OF SPRINGFIELD, MISSOURI.

ARTIFICIAL BAIT.

13,499. Specification of Reissued Letters Patent. Reissued Dec. 24, 1912.

Original No. 972,748, dated October 11, 1910, Serial No. 490,876. Application for reissue filed November 24, 1911. Serial No. 662,240.

*To all whom it may concern:*

Be it known that we, FREDERICK W. BREDER and JOHN H. LOYD, citizens of the United States, residing at Springfield, in the county of Greene, State of Missouri, have invented certain new and useful Improvements in Artificial Bait; and we do hereby declare the following to be a full, clear, and exact description of the invention, such as will enable others skilled in the art to which it appertains to make and use the same.

This invention relates to fishing tackle, and more particularly to artificial bait, and has for one of its objects to improve the construction and increase the efficiency and utility of devices of this character.

Figure 1:
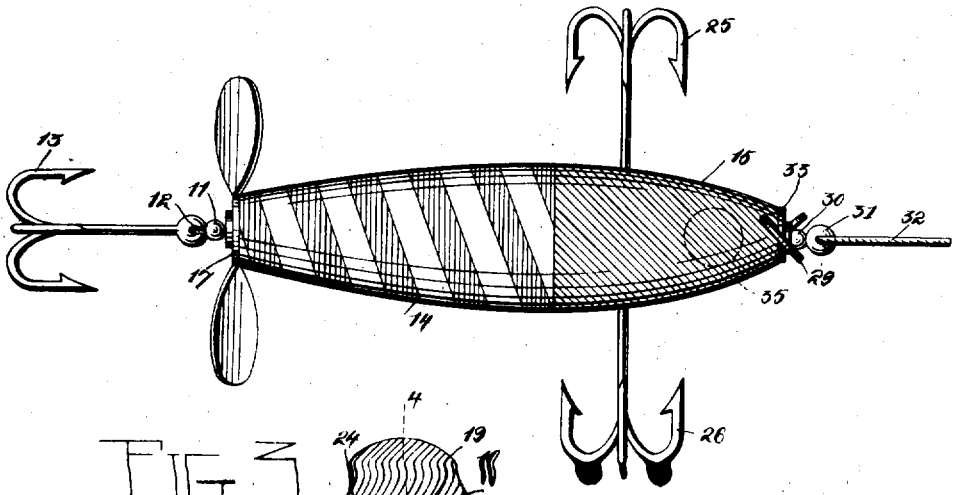
Figure 3:
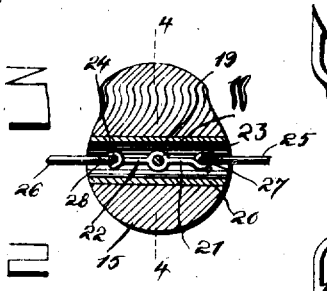
Figure 2:
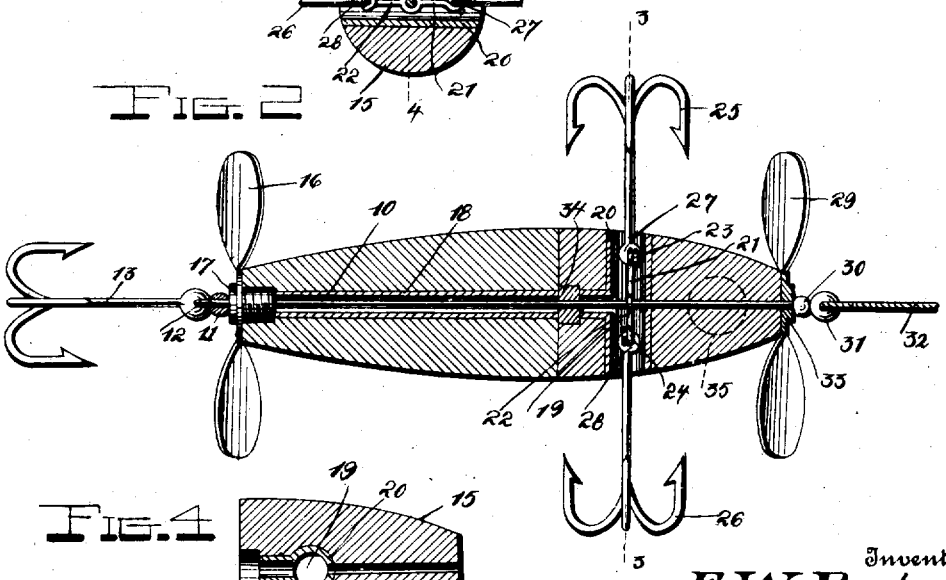
Figure 4:
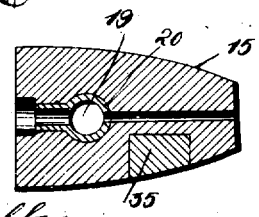

With this and other objects in view, the invention consists in certain novel features of construction as hereafter shown and described and then specifically pointed out in the claims, and in the drawings illustrative of the preferred embodiment of the invention, Figure 1 is a plan view of the improved device, Fig. 2 is a longitudinal section viewed from above, Fig. 3 is a section on the line 3—3 of Fig. 2, Fig. 4 is a section of the forward body portion on the line 4—4 of Fig. 3.

The improved device is provided with a body formed in two sections 14—15, the bodies mounted end to end upon a rod 10, the section 14 being arranged to rotate freely on the rod, while the section 15 is held from turning by a counter weight 35 embedded therein, as shown in Fig. 4. The outlines of the body sections resemble the outlines of a small fish, as shown. For the purpose of illustration in this description the body section 14 will be referred to as the rear body section and the body section 15 will be referred to as the forward body section.

Connected to the rear or smaller end of the rear body section 14 is a spinner member 16 formed of two blades reversely twisted in the usual manner, the hub 17 of the spinner being threaded and fitting thereby rigidly in the body section 14 and bearing at its outer surface against a globular member 11. By this means the friction between the spinner member and the body is reduced to a minimum.

The rear body section 14 is provided with a metal core 18, surrounding the rod 10. The forward body section 15 is provided with a transverse aperture 19, the latter communicating with the interior of the member 15 which surrounds the core rod, and also preferably lined with metal as shown at 20. Connected to the core rod 10, are two oppositely extending arms 21—22, the arms extending into the aperture 19 and terminating in twisted eyes 23—24. The twisted eyes provide means for detachably supporting two "multiple" hooks 25—26, the shanks of the hooks having terminal loops 27—28 adapted to be engaged with the twisted eyes of the arms from the exterior, so that the hooks 25—26 may be detached, if required, as hereafter explained.

Mounted to swing upon the rod 10 in advance of the body section 15 is another spinner member 29 of the usual form and provided with a flat central disk 33 which bears against the forward end of the body 15. The rod 10 is provided with a globular bearing 30 in advance of the plate 33 and spinner 29 and likewise provided with a loop 31 for the attachment of the draft line 32.

Embedded in the rear face of the body 15 is a bearing block 34 through which the rod 10 extends, the block thus serving to prevent wear between the rod and the relatively soft member 15. A counter weight 35 is embedded in the member 15 to maintain it normally with the transverse aperture in horizontal position.

The exterior of the body sections 14—15 is colored in any suitable manner to resemble the body of a minnow, and the rear body portion is provided with encircling spiral stripes of alternating colors, preferably red and white, which when the body portion is revolved a flashing effect will be produced which attracts the fish. The body sections 14—15 will preferably be of wood, while the remaining portions are of metal preferably steel, and the spinner members silver plated, nickel plated, or otherwise coated to present a flashing appearance when in operation.

With a device thus constructed it is obvious that when the bait is drawn through the water the spinner member 16 will be caused to rotate and correspondingly rotate the body section 14, while the spinner member 29 is also rotated, but does not in its rotation effect the body section 15, as it has no connection therewith. If required the hooks 25—26 may be detached and hooks of various sizes connected to the coupling members 23—24. The body sections of the two parts may be of any required size to adapt the device to the catching of different species of fish without material changes in the construction, and it is not desired therefore to limit the invention to body portions of any size or appearance.

What is claimed is:

1. In an artificial bait, a core rod having a bearing block intermediate the ends and with means at one end for the attachment of a draft line, hooks mounted to swing upon said rod at its other end, a forward body portion mounted upon said rod and having a recess to receive said stop collar, said forward body portion having a transverse aperture through which said rod extends, a transverse rod engaging over said core rod within said aperture, hooks movably connected to said transverse rod and extending laterally from said forward body portion, a rearward body portion mounted for rotation upon said core rod, a spinner upon said rearward body portion and rotative therewith upon the core rod, and another spinner rotative upon said core rod in advance of said forward body portion.

2. In an artificial bait, a core rod having means at one end for the attachment of a draft line, hooks mounted to swing upon said rod at its other end, a forward body portion mounted upon said rod, said forward body portion having a transverse aperture through which said rod extends, a transverse rod engaging over said core rod within said aperture, hooks movably connected to said transverse rod and extending laterally from said forward body portion, a rearward body portion mounted for rotation upon said core rod, a spinner having a tubular stud engaging over said core rod and externally threaded and fitting within said rearward body portion and thereby coupling the stud and the spinner thereto, and another spinner rotative upon said core rod in advance of said forward body portion.

3. In an artificial bait, a core rod having means at one end for the attachment of a draft line, hooks mounted to swing upon said rod at its other end, a forward body portion mounted upon said rod, said forward body portion having a transverse aperture through which said rod extends, a transverse rod engaging over said core rod within said aperture, and with open twist coils at its ends, hooks having eyes detachably engaging said coils and extending laterally from said forward portion, a rearward body portion mounted for rotation upon said core rod, and another spinner rotative upon said core rod in advance of said forward body portion.

4. A bait comprising a body having substantially the general shape of a fish and including a fixed front section and a rotatable rear section, said rear section being provided with means for emphasizing the rotation thereof to the vision, a hook connected to the front section and adapted to overlie the inner end of the rear section, and a spinner secured to the outer end of the rear section to effect the rotation of the latter as the bait is drawn through the water.

In testimony whereof, we affix our signatures, in presence of two witnesses.

FREDERICK W. BREDER.
JOHN H. LOYD.

Witnesses:
N. F. Terry,
B. E. Burris.